US008354042B2

(12) United States Patent
Howard

(10) Patent No.: US 8,354,042 B2
(45) **Date of Patent: *Jan. 15, 2013**

(54) METHOD OF RAISING THE FLASH POINTS AND IMPROVING THE FREEZE RESISTANCE OF VOLATILE GREEN SOLVENTS

(75) Inventor: Harry W Howard, Little Egg Harbor, NJ (US)

(73) Assignee: Greensolve LLC, Binghamton, NY (US)

( * ) Notice: Subject to any disclaimer, the term of this patent is extended or adjusted under 35 U.S.C. 154(b) by 19 days.

This patent is subject to a terminal disclaimer.

(21) Appl. No.: 12/632,069

(22) Filed: Dec. 7, 2009

(65) Prior Publication Data

US 2010/0187478 A1 Jul. 29, 2010

Related U.S. Application Data

(63) Continuation-in-part of application No. 12/361,802, filed on Jan. 29, 2009.

(51) Int. Cl.
*C09K 3/00* (2006.01)
*C10L 1/182* (2006.01)
*C11D 7/50* (2006.01)

(52) U.S. Cl. ..................... 252/364; 252/182.29; 44/452; 44/451; 510/407

(58) Field of Classification Search .................... 44/452, 44/451; 252/364, 182.29; 510/407, 411
See application file for complete search history.

(56) References Cited

U.S. PATENT DOCUMENTS 3,705,941 A * 12/1972 Hennart et al. ............... 514/136
3,867,526 A * 2/1975 Hennart et al. ............... 514/136
5,064,557 A 11/1991 Fusiak
5,098,591 A 3/1992 Stevens
5,393,451 A * 2/1995 Koetzle ......................... 510/365
5,405,547 A 4/1995 Rinehart
5,425,893 A * 6/1995 Stevens ............................. 134/1
5,597,788 A * 1/1997 Stevens ......................... 510/212
6,187,736 B1 2/2001 Jarema
6,843,812 B2 * 1/2005 Stephanos ....................... 44/266
6,897,008 B1 * 5/2005 Hendrickson et al. ........ 430/306
7,166,664 B1 1/2007 Anderson
7,176,174 B2 2/2007 Flippini et al.
7,273,839 B2 * 9/2007 Koetzle ......................... 510/407
7,309,684 B2 12/2007 Flippini et al.
7,833,959 B1 * 11/2010 Koetzle ......................... 510/407
2001/0053756 A1 12/2001 Jarema
2005/0100823 A1 * 5/2005 Hendrickson et al. ........ 430/300
2006/0019332 A1 1/2006 Zhang et al.
2006/0081822 A1 * 4/2006 Koetzle ......................... 252/601
2006/0128589 A1 6/2006 Shriner
2008/0271761 A1 11/2008 Sherrel et al.
2010/0187478 A1 * 7/2010 Howard ........................ 252/364
2010/0247784 A1 * 9/2010 Koetzle ......................... 427/386

FOREIGN PATENT DOCUMENTS

WO 2008/105758 A1 9/2008

OTHER PUBLICATIONS

"Clean Cities of Middle Tennessee"; Article (online) Apr. 5, 2008, [retrieved on Feb. 21, 2010]; Retrieved from the Internet: ,<URL: http://web.archive.org/web/20080405060339/http://www.tennesseecleanfuels.org/Methanol.html> para [0001]-[0002]; 2 pages.
Cargill Dow and Ashland Sign Ethyl Lactate Agreement: Green Solvents from Renewable Resources; Article [online]; Business Wire, Apr. 23, 2002, [retrieved on Feb. 22, 2010]; Retrieved from the Internet: URL; http//www.allbusiness.com/electronics/electronics-overview/5935032-1.html> para [0003]; ti; 3 pages.
International Search Report and Written Opinion for PCT/US10/21350; dated Mar. 3, 2010; 8 pages.
International Search Report and Written Opinion for PCT/US2010/060017, dated Aug. 25, 2011, 7 pages.

* cited by examiner

*Primary Examiner* — Joseph D Anthony
(74) *Attorney, Agent, or Firm* — Brown & Michaels, PC

(57) ABSTRACT

A method of raising the flash point of a green solvent includes adding from about 0.05 to 5.0 wt. % of at least one terpene alcohol, based on the weight of the at least one terpene alcohol and the green solvent. Green solvents are derived from organic matter, such as plants. They are not the product of petroleum feed stocks. Preferably, two terpene alcohols are added to the green solvent. Further, the addition of at least one terpene alcohol improves both the freeze resistance and the shelf life of the final green solvent solution.

16 Claims, No Drawings

METHOD OF RAISING THE FLASH POINTS AND IMPROVING THE FREEZE RESISTANCE OF VOLATILE GREEN SOLVENTS

REFERENCE TO RELATED APPLICATIONS

This application is a Continuation-In-Part of application Ser. No. 12/361,802, filed Jan. 29, 2009, entitled "Method of Raising the Flash Point of Volatile Organic Compounds". As to the common subject matter, the benefit under 35 USC §119(e) of the above identified United States Utility Application is hereby claimed, and the aforementioned application is hereby incorporated herein by reference.

FIELD OF THE INVENTION

The invention pertains to the field of organic solvents. More particularly, the invention pertains to adding a combination of terpene alcohols to generally environmentally safe ("green") solvents, which unfortunately also exhibit unacceptable volatility characteristics, to increase the flash points of these compounds for an expanded scope of uses.

BACKGROUND OF THE INVENTION

"Green" solvents, such as certain alcohols, acetates, esters, etc. are regarded as such because of their sources of origin (non-petroleum based) and the fact that they biodegrade readily after use without environmental damage. All solvents are classified as Volatile Organic Compounds due to their photo-reactive qualities and Hazardous Air Pollutant (HAPS) status. They are further sub-classified based upon their vapor pressures, boiling points and flash points. The flash point is significant because it is the point at which the liquid becomes a volatile vapor, mixes with oxygen and thereby acquires its most combustible or flammable state. In the United States, the Environmental Protection Agency (EPA) and the Department of Transportation (DOT) have classified such compounds based on their volatilities or "flash points".

The EPA and DOT Volatile Organic Compound ("VOC") classifications are as follows:

| | |
|---|---|
| Class I liquids (flammable) | flash point at or below 100° F. |
| Class II liquids (combustible) | flash point from 100° F. to below 140° F. |
| Class III liquids (combustible) | flash point above 140° F. to below 200° F. |

Obviously, the more flammable a solvent, the more restrictions exist on its use. The Federal Government has classified such solvents as Hazardous Materials or "HAZMATS". Further, manufacturers that utilize solvents must handle the more volatile liquids more carefully and have to address issues involving atmospheric volatility, shelf life and worker health concerns from prolonged exposure to these chemicals. "Green" solvents are usually more costly than petroleum based solvents and may be less effective as solvents than those based on petroleum hydrocarbon stock. However, if these solvents can be modified so that their flash points can be raised, this would result in significantly more uses for these compounds as well as increasing their shelf lives. It is desirable therefore to raise the flash points of a variety of green solvents without substantially increasing the cost of these solvents. This would expand the range of potential uses for and improve the overall solubility of the green solvents.

Some examples of green solvents include, but are not limited to, alcohols such as methanol, ethanol, benzyl alcohol, and turpentine. The problem with these alcohols, however, is that due to their high VOC, they are considered HAPS which violate Federal and State emissions regulations.

Green solvents include, for example, ethyl lactate, with a flash point of 115° F., which although not considered a Class I VOC, still places limitations on their potential uses. Green esters, such as N-butyl propionate, ethyl lactate, methyl soyate, and terpene alcohols, are considered combustible, having flash points ranging from 115° F. up to 250° F. However, they are slow to evaporate and exhibit good solvating characteristics when used in blended compounds. Nonetheless, they are considered environmentally clean and would be utilized more extensively if their volatilities can be reduced.

Many terpene alcohols have the chemical formula: $C_{10}H_{18}O$. Terpenoid is the name given to the more general class of compounds which are characterized by a repeating carbon skeleton of isoprene. Terpenoids are derived from plants, trees, flowers, and other vegetation which allows their classification as "green compounds". They come in the form of liquids, solids, waxes, oils, and alcohols. Terpenoids are divided into groups determined by the number of carbon atoms and repeating isoprene units. They may be formed as acyclic, monocyclic, or polycyclic structures.

Terpene alcohols in various forms have been used for centuries in fragrances due to their compatibility with other compounds and their minimal negative environmental impact. The flavor and fragrance industries divide terpineols, which are a type of terpene alcohol, into alpha-, beta- or gamma-terpineols, with Beta-Terpineol being non-naturally occurring. Terpene alcohols have been used for other purposes, such as disinfectants, cleaning compounds, soaps, cosmetics and colognes. They are also known to add, enhance or mask the odor of products which perhaps might be offensive to humans or animals.

U.S. Pat. No. 7,273,839 B2 discloses the use of an alpha terpineol with petroleum based organic solvents and blends of solvents to increase the flash points of these solvents. The patent discloses that the addition of at least 10%, by weight, of an alpha terpineol to a single solvent or combination of solvents increases the flash point of the blended compound. They show examples and claim that at least 5% of one alpha terpineol increases the flash points of specific solvents to useful levels. In one example, they claim that by adding 18 wt % of alpha terpineol to acetone, they increased the solvent's flash point from 0° F. to 143.6° F. However, excessive alpha terpineol loadings (10-18%) cause rapid settling and poor shelf life which substantially adds to the cost of a solvent or combination of solvents. This is therefore a rather costly means to raise flash points.

The excessive loading (i.e., in excess of 10-15% by weight) of a single alpha terpineol results in paint and adhesive formulating problems due to incompatibility with some key resins that shows up during film formation and drying. The formulation often separates, leaving the terpineol behind. The terpineol acts as a diluent, phase separates, perhaps forming under the film, within the film, and upon the surface. The result for fast drying lacquers, vinyls, and similar coatings was complete rejection of the coating by the substrate. After 2-3 days of drying time, the stressed films lifted and floated, exhibiting no ultimate adhesion or bond strength. Vinyls heavily loaded with terpineol perform the worst, because they are in a ketone solvent solution and exhibit a low molecular weight during application. As soon as the ketone based solvents evaporate, the film becomes stressed due to the higher molecular weight of the vinyl resin and the film simply delaminates from the surface. In this instance, a heavy loading of the terpineol acts like a parting agent (or wax) thus preventing permanent adhesion of the vinyl film to the substrate.

SUMMARY OF THE INVENTION

The method of raising the flash points of volatile green solvents uses a minimal amount of terpene alcohols to allow the blended compound to have a higher flash point. This is achieved by using a low concentration of at least one terpene alcohol. This permits more uses for these green solvents than would otherwise have been expected based on each solvent's virgin flash point. By adding only from about 0.05 to 5.0 wt. % of at least one terpene alcohol, the flash points of the green solvents is increased, in some cases significantly, resulting in an increased range of uses for these compounds. This also contributes to longer shelf life with negligible settling as well as improving its freeze point resistance. Preferably, two terpene alcohols are employed in the solvent blend.

DETAILED DESCRIPTION OF THE INVENTION

The addition of about 0.05 to 5.0 wt %, based on the total weight of the blended compound, of at least one terpene alcohol to non-petroleum based green solvents raises the flash points of these solvents. "Green" solvents, such as certain alcohols, acetates, esters, etc. are classified as such because of their non-petroleum origin and the fact that they biodegrade readily after use without having a deleterious effect on the environment. They are naturally occurring in the environment. The combination of being "green" and either VOC exempt (under EPA and DOT "Volatile Organic Compound" classifications) or at least having a higher volatility offers formulators and manufacturers a unique class of solvents with which to formulate solvating compounds that are readily compliant with existing environmental regulations.

Additional improvements in the usefulness of green solvents can be made by adding up to 5%, by weight, based on the total weight of the final solvent formulation, of at least one terpene alcohol. Preferably, from 2 to 4%, by weight, based on the total weight of the final solvent formulation, of at least one alpha terpineol further increases the flash point of green solvents. It has been discovered that lower amounts of alpha terpineols added actually improves the performance of the resulting solvent compound as opposed to adding significantly higher amounts of alpha terpineols. An added benefit is that since terpene alcohols can be expensive, the less used the better as the less expensive is the final solvent formulation.

Examples of terpene alcohols include geraniol, citronellol, nerol, menthol, nerolidol, and farnesol. These compounds can be acquired from manufacturers such as Flavors and Fragrances, Inc. and Millennium Chemicals, Inc.

It has also been discovered that by adding small amounts of at least one terpene alcohol to a green solvent significantly improved the solvent's resistance to freezing, as well.

The "low loading" of a combination of terpene alcohols significantly expands the uses to which the green solvents can be employed. The small amount of at least one terpene alcohol, and preferably two terpene alcohols, allows the formulator to "fine tune" the solvent formulation for use in a much wider range of applications than before. For example, these combination compounds can now successfully be used for expanded applications in the following industries. To be concise, the abbreviation "GSB" is used to represent the potential "green solvent blends" that may be formulated according to the present disclosure.

1. Paints, Coatings and Finishes.
 a. GSB can dissolve or disperse resins and pigments into a homogenous solution for packaging and/or application.
 b. GSB offers a greater choice of solvent blends which determines paint appearance and dry time.
 c. GSB readily solubilizes in and evaporates from the applied paint, reducing dry time and service restoration.
 d. GSB permits high-solids coatings for thick bather protection.
 e. GSB facilitates packaging in bulk, container, and/or aerosols.
 f. GSB permits safe application of formerly explosive, flammable and exempt-VOC solvents.
2. Printing Inks, Printing press maintenance.
 a. GSB more readily adjusts the printing ink viscosity and drying time.
 b. GSB permits cleaning of machined or polished press parts to remove inks without abrasive damage.
 c. GSB facilitates emissions compliance and safer use.
3. Adhesives
 a. GSB is used to prepare surfaces and render them clean prior to adhesive application.
 b. GSB may be incorporated into the adhesive formula to adjust viscosity and "tack time".
 c. GSB is often used to soften or remove adhesives without damaging substrate surfaces.
4. Pharmaceuticals.
 a. GSB may be used during processing, synthesis and extraction of non-desired chemicals or ingredients.
 b. GSB may be used in the inks for logos or trade name identification of tablets or capsules.
 c. GSB may be used for printing and labeling of containers and cartons and in the packaging of products.
5. Agriculture.
 a. GSB may be used for blending pesticides such as insecticides like chloropyrifos into vehicles for application.
 b. GSB facilitates adjustment for spray efficiency and even film application.
6. Food and Drink Industry.
 a. GSB may be used to process oils for foods.
 b. GSB may be used to add flavor and fragrances to liquids and foods.
 c. GSB may be used for inks and adhesives in the packaging of cartons and containers.
7. Personal care products.
 a. GSB may be used in hairspray and cosmetics.
 b. GSB may be used for fingernail polish and fingernail polish remover.
 c. GSB may be used in specialty formulae for antiseptics.
8. Transportation industry.
 a. Aircraft, Watercraft, and Automotive cleaners and degreasers.
 b. Windshield deicers, cleaners.
 c. Brake cleaners, hydraulic brake fluid.
 d. Carburetor and fuel injection cleaners.
 e. Touch-up spray paint for bodies, identification purposes and identification labels for tires.
9. Electronic, Electrical Industry.
 a. GSB can be used as a cleaner of electrical parts, contacts, and hardware used in the electrical industry.
 b. GSB may be used as a safety cleaner, flux remover, etc. on electrical printed circuit boards.
 c. GSB may be used for the preparation, cleaning and assembly of computers and/or hardware and printers.
 d. GSB may be packaged in either bulk or convenient aerosols.

e. GSB is an excellent oil and contact cleaner since it evaporates leaving no residual contamination.

10. Aerospace Industry.

a. GSB may be used for the preparation, cleaning and assembly of precision aerospace parts and assemblies.

b. GSB may be used to clean machine oils, excessive lubricants, human fingerprints, etc. from delicate parts.

11. Optics, Optical lenses, assemblies.

a. GSB and GSB based compounds may be used as cleaners of lenses and precision optics.

b. GSB provides convenience and eliminates human oils from finger contact via aerosol spray cleaners, thus leaving no residual.

12. Tanker bilge and/or hold cleaner.

a. GSB may be used to provide safe, water soluble, biodegradable cleaners for cleaning tanker holds.

b. GSB may be blended with paraffinic and/or microcrystalline wax residuals from crude oil transports, tankers, barges and storage vessels.

With respect to bilge and hold cleaning the tanker holds from varied wax solids is a significant problem. For example, U.S. Navy fuel tankers have a constant problem which requires arduous cleaning and strict attention to the safe removal of residual fuel or oil.

Some of the "Bunker Grades" are thick as tar. The clean out process may be achieved by either using GSB blends with water pressure or eliminating water entirely. Since the GSB's are environmentally more friendly than conventional petroleum based solvents, run-off from the cleaning operation becomes less problematic by being easier and less costly to dispose of or to contain.

EXAMPLES

(I) Comparison Tests

For the purposes of the following examples, "IFF" stands for the supplier, International Flavors and Fragrances, Inc. and "Mil" stands for the supplier, Millennium Chemicals, Inc. "AJAX" is a terpene alcohol available from IFF, having the chemical formula: C10-H18-O. Mil-350 is a terpene alcohol available from Mil. It is a terpene alcohol, whose chemical name is 3-cyclohexene-1-methanol, alpha, alpha, 4-trimethyl.

Flash Point Comparison

| Green solvent | flash point |
|---|---|
| Ethyl lactate | 115° F. |
| Ethyl lactate + 2%, by wt., A-JAX | 145° F. |
| Ethyl lactate + 2%, by wt. A-JAX + 2%, by wt. 350 | 160° F. |

Flash Point Comparison

| Solvent | Flash Point |
|---|---|
| Dimethyl Carbonate | 63 Deg. F. |
| Dimethyl Carbonate + 2% wt. 350 + 2% wt. A-JAX | 105 Deg. F. |
| Dimethyl Carbonate + 24% wt. Acetone + 2% wt. A-JAX | 170 Deg. F. |

Freeze Point Comparison

| Solvent | 96 hr. Freeze Duration |
|---|---|
| Dimethyl Carbonate | Freeze at 38 Deg. F. |
| Dimethyl Carbonate + 24% wt. Acetone + 2% wt. A-JAX | Liquid at 2 Deg. F. (No Freeze) |

By increasing the flash point and improving freeze resistance of the final solvent formulation, an expanded variety of uses, plus improved shipping conditions and storage capabilities are now available to green solvents which would otherwise have remained exempt based on their virgin properties under VOC standards.

(II) Examples of Invention Showing Improved Solvent Flash Points and Expanded Uses The Terpineol blend identified below includes a 1:1 blend, by weight, of the terpene alcohols A-JAX and Mil-350.

1. 98% wt. Acetone+2% wt. terpene alcohol blend.

Flash point: >140 Deg. F., Blended status: Exempt VOC (safe solvent).

Practical uses: High flash acetone may be used in specialty coatings, such as Vinyls and Chlorinated Rubbers, Epoxies, Lacquers and Acrylics to adjust VOC emissions of these products to meet local and Federal regulations. May also be used in solvent based and water based emulsions, pastes, and strippers. It leaves no film upon fast evaporation and is excellent for cleaning electronics and precision metal parts.

2. 49% wt. Acetone+49% wt. Dimethyl Carbonate (DMC)+2% wt. terpene alcohol blend.

Flash point: >150 Deg. F.; Blended status: Exempt VOC (safe solvent).

Practical uses: As super acetone having a high flash point, fast drying time with less susceptibility to blushing or water sensitivity.

It has identical utility as straight acetone but is not water soluble and may be used for water clean-up. It may be used to adjust solvent based formulas to meet emission regulations. DMC is considered as a green solvent and is excellent for the cleaning of specialty precision parts such as electronics, printing presses, mills and optics.

3. 60% wt. Acetone+36% wt. P-Chlorobenzotrifluoride+4% terpene alcohol blend.

Flash point: >135 Deg. F., Blend status: Exempt VOC (safe solvent).

Practical uses: Excellent balanced solvent for addition to coatings or finishes, such as paints and varnishes. P-Chlorobenzotrifluoride adds the characteristic of a medium to slow evaporation rate and functions as a tail solvent to improve film formation and gloss. It is an excellent cleaner, preparation solvent, degreaser and dewaxer. It is suitable for bulk or aerosol packaging as a cleaner, especially specialty parts cleaning and assembly. It may also be used to adjust existing formulations to meet emission regulations.

4. 97% wt. Ethyl Lactate+3% wt. terpene alcohol blend.

Flash point: >147 Deg. F., Blended status: Environmental Green VOC (safe solvent).

Practical uses: It is an excellent green solvent useful as a solvent cleaner, water based cleaner and for inclusion into industrial coatings. It emits low odor, is easy to use, and is compatible with many solvents and surfactant cleaners. It is considered safe and green for those products needing excellent performance as well as requiring biodegradability.

5. 26% wt. Ethyl Lactate+70% wt. Acetone+4% terpene alcohol blend.

Flash point: >145 Deg. F., Blended status: Low VOC (safe green solvent).

Practical uses: May be used in solvent blends for coatings and finishes and since the combination is water miscible it has unique capabilities of equal performance in solvents or water based product formulas. It is excellent as a surface cleaner, concrete degreaser, general surface stripper and anti-graffiti stripper. It may be packaged in bulk or as an aerosol and is, of course, biodegradable.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A method of raising the flash point of a green solvent comprising:

determining an amount of at least one terpene alcohol in a range of about 0.05 to about 5.0 wt. % based on the total weight of the green solvent and the terpene alcohol such that the addition of the terpene alcohol raises the flash point of the green solvent by at least 20° F.; and adding the terpene alcohol to the green solvent to form a green composition;

wherein the terpene alcohol originated from naturally occurring non-petroleum stock and is biodegradable; and wherein the green solvent originated from naturally occurring non-petroleum stock and is biodegradable.

2. The method of claim 1, wherein the amount of the at least one terpene alcohol is in a range of about 2 to about 3 wt. %, based on the total weight of the green solvent and the at least one terpene alcohol.

3. The method of claim 1, wherein the at least one terpene alcohol is selected from the group consisting of geraniol, citronellol, nerol, menthol, nerolidol, and farnesol.

4. The method of claim 1, wherein the at least one terpene alcohol comprises two terpene alcohols.

5. The method of claim 4, wherein each terpene alcohol is present in an amount in a range of about 0.05 to about 2.0%, by weight, based on the total weight of the green solvent and the terpene alcohols.

6. The method of claim 5 wherein each terpene alcohol is present in an amount in a range of about 0.5 to about 1.5%, by weight, based on the total weight of the green solvent and the terpene alcohols.

7. The method of claim 1 wherein the green solvent is selected from the group consisting of alcohols, acetates, and esters.

8. The method of claim 1, wherein the green solvent is selected from the group consisting of methanol, ethanol, benzyl alcohol, dimethyl carbonate, N-butyl propionate, ethyl lactate, methyl soyate, and turpentine.

9. A method of improving the freeze resistance of a green solvent comprising:

determining an amount of acetone and an amount of at least one terpene alcohol in a range of about 0.05 to about 5.0 wt. % based on the total weight of the green solvent, the acetone, and the terpene alcohol such that the addition of the acetone and the terpene alcohol lowers the freezing point of the green solvent by at least 36° F.; and adding the terpene alcohol and the acetone to the green solvent to form a green composition;

wherein the terpene alcohol originated from naturally occurring non-petroleum stock and is biodegradable;

wherein the green solvent originated from naturally occurring non-petroleum stock and is biodegradable.

10. The method of claim 9, wherein the amount of the at least one terpene alcohol is in a range of about 2 to about 3 wt. %, based on the total weight of the green solvent and the at least one terpene alcohol.

11. The method of claim 9, wherein the at least one terpene alcohol is selected from the group consisting of geraniol, citronellol, nerol, menthol, nerolidol, and farnesol.

12. The method of claim 9, wherein the at least one terpene alcohol comprises two terpene alcohols.

13. The method of claim 12, wherein each terpene alcohol is present in an amount in a range of about 0.05 to about 2.0%, by weight, based on the total weight of the green solvent and the terpene alcohols.

14. The method of claim 13, wherein each terpene alcohol is present in an amount in a range of about 0.5 to about 1.5%, by weight, based on the total weight of the green solvent and the terpene alcohols.

15. The method of claim 9 wherein the green solvent is selected from the group consisting of alcohols, acetates, and esters.

16. The method of claim 9, wherein the green solvent is selected from the group consisting of methanol, ethanol, benzyl alcohol, dimethyl carbonate, N-butyl propionate, ethyl lactate, methyl soyate, and turpentine.

* * * * *